United States Patent [19]

Long

[11] 4,017,226
[45] Apr. 12, 1977

[54] APPARATUS FOR LINING A CONTINUOUS CONCRETE PIPE

[76] Inventor: Joe E. Long, 2535 S. Main St., Santa Ana, Calif. 92707

[22] Filed: May 29, 1973

[21] Appl. No.: 365,034

Related U.S. Application Data

[62] Division of Ser. No. 164,395, July 20, 1971, Pat. No. 3,773,874.

[52] U.S. Cl. .................................... 425/59; 425/64; 425/122
[51] Int. Cl.[2] ........................................ B28B 21/12
[58] Field of Search ............................ 249/20–22; 425/59, 62–64, 432, 110, 112–113, 122; 264/32–33, 35

[56] References Cited

UNITED STATES PATENTS

| 857,588 | 6/1907 | Boyle | 425/59 |
| 2,969,576 | 1/1961 | Fuller | 425/219 |
| 3,091,013 | 5/1963 | Robinson | 425/59 |
| 3,193,901 | 7/1965 | Lee et al. | 425/59 |
| 3,252,198 | 5/1966 | Fuller | 425/59 |
| 3,380,259 | 4/1968 | Rubenstein | 425/59 |
| 3,520,749 | 7/1970 | Rubenstein | 425/113 |
| 3,583,046 | 6/1971 | Dickenson et al. | 425/432 |

*Primary Examiner*—Robert L. Spicer, Jr.
*Assistant Examiner*—John McQuade
*Attorney, Agent, or Firm*—Warren F. B. Lindsley

[57] ABSTRACT

An apparatus for forming a continuous concrete pipe having an integrally formed lining extending over part or all of the surface of its bore.

5 Claims, 9 Drawing Figures

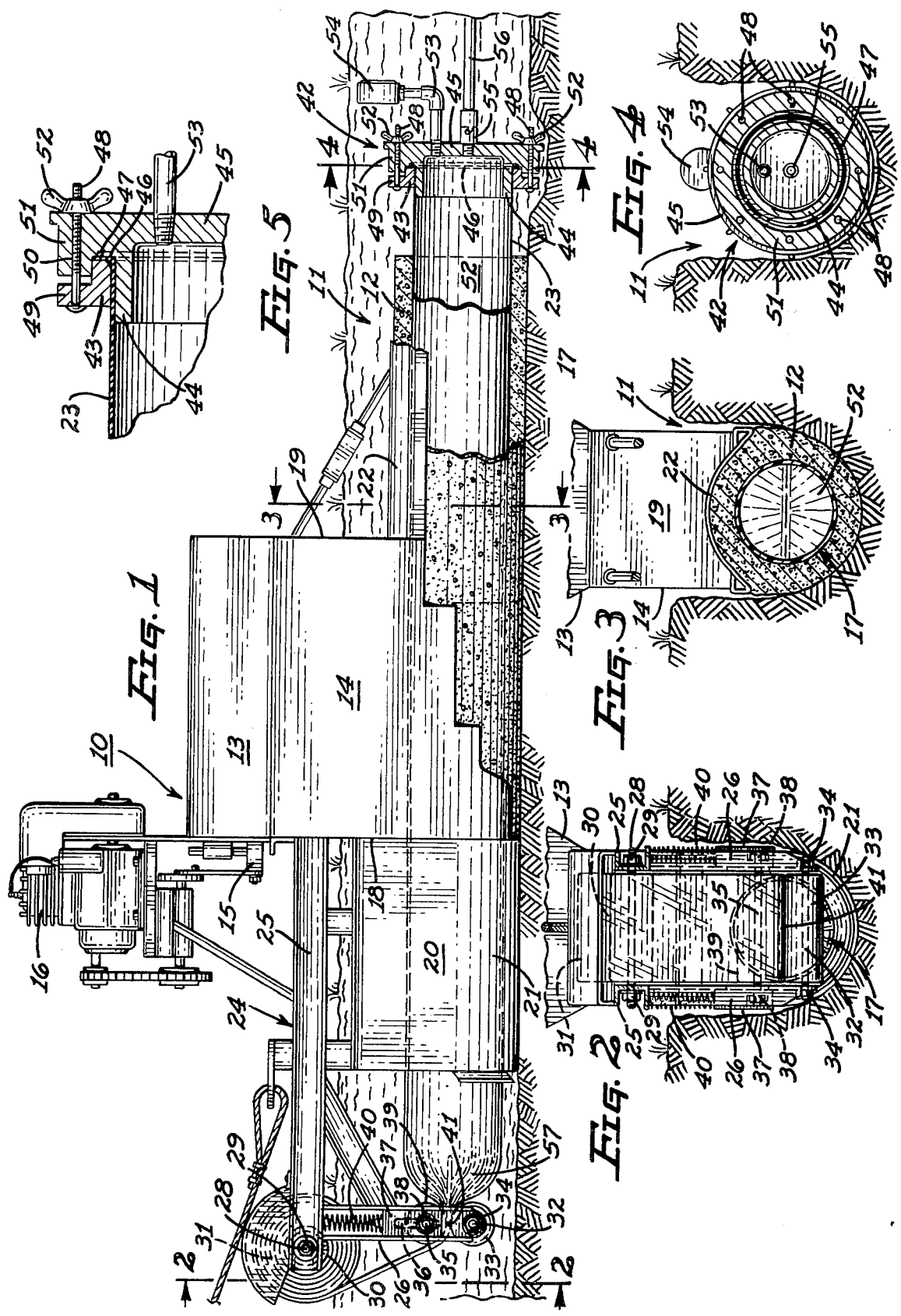

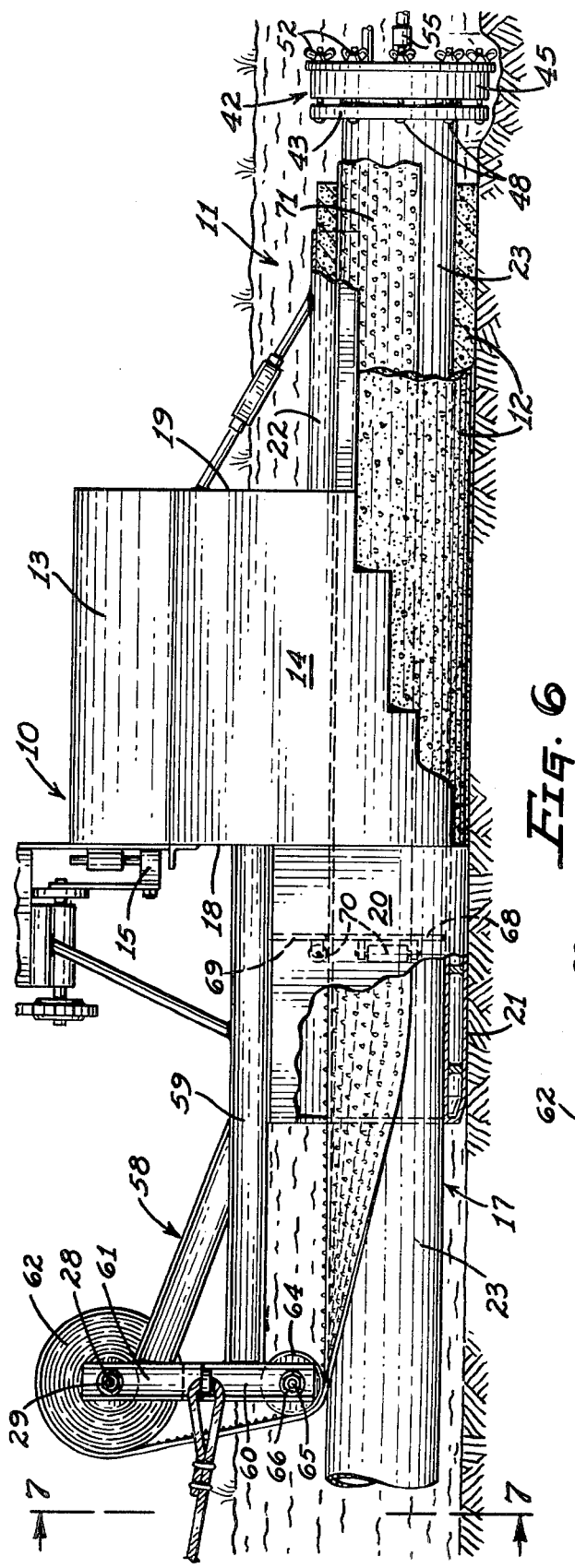
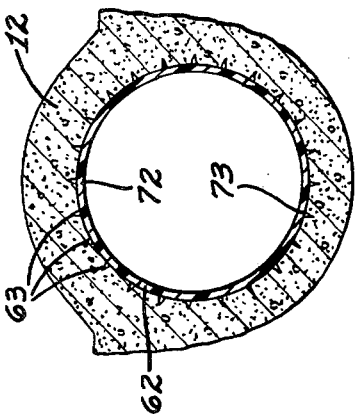
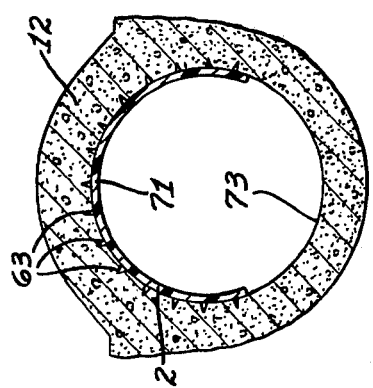
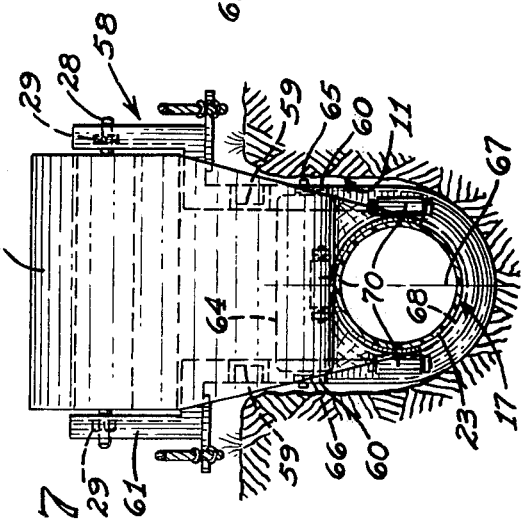

1

APPARATUS FOR LINING A CONTINUOUS CONCRETE PIPE

BACKGROUND OF THE INVENTION

This invention is directed to apparatus for forming a continuous concrete pipe and more particularly to a means and method for lining the pipe over a part or all of the surface of its bore.

Field of the Invention

This invention relates to a continuous concrete pipe laying machine which travels along in a trench and which receives the plastic concrete mud or cementitious material and automatically forms a continuous pipe thereof in the bottom of the trench as the machine is moved along in the trench.

Description of the Prior Art

Heretofore cntinuous concrete pipes have been formed in trenches by pipe laying machines pulled along a previously dug trench as disclosed in U.S. Pat. No. 2,969,576. These pipes have not been lined at least during their forming operation and consequently have not been resistant to many of the chemical compositions encountered in the pipe or capable of large internal pressures. Accordingly, a need exists for a cheaply formed, continuous concrete pipe which is lined or at least partly lined with an impervious material.

SUMMARY OF THE INVENTION

In accordance with the invention claimed a new and improved apparatus is provided for lining a continuous formed concrete pipe.

It is, therefore, one object of this invention to provide a new and improved apparatus for forming a continuous lines concrete pipe.

Another object of this invention is to provide a continuous concrete pipe laying machine employing a continuous roll fed collapsible core which is inflatable for forming the concrete pipe and remains in the pipe as an integral lining thereof.

A further object of this invention is to provide a continuous concrete pipe laying machine employing means for lining at least a part of the inner bore of said pipe or conduit.

A still further object of this invention is to provide a continuous pipe forming apparatus for large or small pipes in which the inner core forming the lining for the finished concrete pipe is automatically presented in the poured pipe during the pipe forming operation.

A still further object of this invention is to provide apparatus for lining a continuously formed pipe in which the lining covering part or all of the bore of the pipe is fed over, under or around an inflatable core during the pipe forming operation.

A still further object of this invention is to provide improvements to, and adaptation in the use of a continuous concrete pipe laying machine; such improvements and adaptations being directed to the utilization of a continuous inflatable inner core of plastic or other suitable material having radial projections on its outer circumferential surface which are adapted to engage the inside surface of the concrete pipe being formed to provide an integral continuous plastic lining which will remain within the inside surface of the finished pipe or conduit when the inflatable core is evacuated.

Further objects and advantages of the invention will become apparent as the following description proceeds and the features of novelty which characterize this invention will be pointed out with particularity in the claims annexed to and forming part of this specification.

BRIEF DESCRIPTION OF THE DRAWINGS

FIG. 1 is a left hand side elevational view of a continuous concrete pipe laying machine incorporating some of the improved features and adaptations of this invention;

FIG. 2 is a front elevational view of FIG. 1 taken along the line 2—2;

FIG. 3 is a vertical transverse sectional view taken on the line 3—3 of FIG. 1;

FIG. 4 is a vertical transverse sectional view taken on line 4—4 of FIG. 1;

FIG. 5 is an enlarged fragmentary sectional view taken on line 5—5 of FIG. 4;

FIG. 6 is a left hand side elevational view of a modification of the continuous concrete pipe laying machine shown in FIG. 1;

FIG. 7 is a front elevational view of the machine shown in FIG. 6 taken along the line 7—7;

FIG. 8 is an enlarged vertical transverse sectional view through a finished concrete pipe or conduit, showing a partial plastic lining integral with the inside surface of the pipe; and FIG. 9 is an enlarged vertical transverse sectional view through a finished concrete pipe or conduit, showing a complete circumferential plastic lining integral with the inside surface of the pipe.

DESCRIPTION OF THE PREFERRED EMBODIMENT

Referring more particularly to the drawings by characters of reference, FIGS. 1 and 6 disclose a continuous concrete pipe laying machine 10 adapted to be pulled along in a previously prepared ditch 11 which may be semi-circular, wherein a concrete pipe or conduit 12 is automatically formed as the machine travels along in the ditch. The finished pipe or conduit 12 has a configuration substantially as shown in FIGS. 3, 8 and 9.

The continuous concrete pipe laying machine 10 comprises a frame formed by a hopper portion 13 and a pipe forming portion 14. The hopper portion 13 receives the wet plastic cement mixture and presents it to the pipe forming portion 14 wherein the wet cement mixture is agitated and tamped by means of suitable tamping apparatus 15. The tamping apparatus 15 is driven by a gas engine 16 mounted on the hopper portion 13 to automatically form the concrete pipe 12 around a suitable cylindrical core member 17 as the machine travels forward in the prepared ditch 11. The hopper portion 13 and the pipe forming portion 14 are enclosed at their front and rear ends by laterally disposed vertical baffles or walls 18 and 19 respectively. Wall 18 has attached to it a forwardly and rearwardly extending core support member or guide portion 20 having a semi-circular bottom 21 which is adapted to slide along the semi-circular bottom of ditch 11 as the machine moves forward, the inside surface of which trowels the bottom of the bore of conduit 12. The core support is also positioned so as to define a space between the bottom of the trench and the underside of the core support member whereby said core support member provides a troweling surface for the lower half of the bore of the pipe to be formed.

Wall 19 has a rearwardly extending semi-cylindrical top troweling member 22 which is adapted to finish the top portion of the formed pipe or conduit 12 as it emerges from the rear of the machine.

The above description of the continuous concrete pipe laying machine 10 is purposely very brief, only describing the principle parts of the machine. The machine is disclosed in more detail in U.S. Pat. No. 2,969,576, above identified. In accordance with the invention claimed, core member 17, comprising a continuous inflatable member, is used with machine 10 and becomes the surface of the pipe bore or a lining for the continuous concrete pipe or conduit 12 formed within ditch 11.

To this end machine 10 is provided at its forward end with a rigid frame structure 24 comprising a pair of forwardly extending channel members 25 having secured thereto at their extreme forward ends a pair of downwardly depending channel members 26. Channel members 26 are rigidly attached to channel members 25 and are additionally rigidified by a pair of diagonally disposed channel members 27 which are suitably secured to channel members 25 and 26. An axle 28 projects through suitable bearing holes at the extreme outer ends of channel members 25 and is held in transverse relation between the pair of channel members by washers and nuts 29 which are threaded onto the outer ends of axle 28. Axle 28 supports a freely mounted roller 30 which in turn supports a large continuous roll 31 of a flattened expandable plastic hose formed of a suitable material such as polyurethane or polypropeline.

The lower ends of channel members 26 are provided with bearing holes to receive and support the threaded outer ends of an axle 32 which is adapted to support a freely mounted rotatable roller 33. Roller 33 is confined in transverse relation between channel members 26 by suitable washers and nuts 34 which are threaded onto both ends of axle 32. Directly above and in vertical alignment with axle 32 is another axle 35 which extends transversely between channel members 26 and through vertical elongated holes 36 in the inside walls of these channels and through countersunk drilled holes in each of a pair of vertically slidable steel blocks 37 where the threaded ends of axle 35 are secured by washers and nuts 38. Another roller 39, similar to roller 33, is journaled to freely rotate on axle 35 and is normally forced into yielding contact with roller 33 by the pressure of a pair of compression springs 40. Springs 40 are secured between the lower legs of channels 25 and the tops of the sliding blocks 37, to thereby exert sufficient downward pressure on roller 39 to keep it in longitudinal contact with the lower roller 33, or on any material which may be passing between the rollers, to provide an air-tight seal at point 41.

To make ready or prepare the continuous concrete pipe laying machine 10 for performing its primary function of constructing a continuous concrete pipe in a previously prepared ditch such as 11, it is only necessary to manually unwind a sufficient length of the flattened plastic hose from supply roll 31 and thread the same between the rollers 33 and 35 and through cylindrical openings (not shown) in the pipe forming portion 14 of the machine. The plastic hose extends rearwardly beyond the extremities of the machine where it is secured in air-tight relation in a suitable bulkhead structure 42. Bulkhead structure 42 comprises an inner clamp ring 43, the inner circumference of which is sized to loosely fit over and around an inwardly projecting circumferential flange 44 which is an integral part of a bulkhead cover plate 45 with sufficient clearance between their matching surfaces to allow for the passage of the cylindrical core member 17 therebetween. Core member 17 extends a sufficient distance beyond the outer face of the inner clamp ring 43 to form a radially projecting circumferential flange 46 of core material. This core material is secured in air-tight relationship between the outer face of the cover plate 45 and clamp ring 43. The seal is accomplished by means of an annular O-ring 47 imbedded in the inner face of cover plate 45 when pressure is applied thereto by the tightening up of suitable clamping bolts 48 which are secured in the radially extending flange 49 of the inner clamp ring 43. Bolts 48 are arranged to extend through clearance holes 50 located around the perimeter of the radially extending flange 51 of bulkhead cover plate 45 by means of thumb nuts 52 clearly shown in FIGS. 1 and 5.

The rear face of the bulkhead cover plate 45 is provided with two threaded bores which extend through the cover plate in communication with the area encircled by the circumferential flange 44 and the inside of bore 52 of the inflatable core member 17. One of the threaded bores is provided with suitable plumbing 53 which supports a pressure gage 54 and the other threaded bore is adapted to receive one part of a quick disconnect hose fitting 55, the other part of the fitting being attached to one end of a supply hose 56. Supply hose 56 may be connected to any suitable source of compressed air or water under pressure which may be utilized for inflating the core member 17.

After the inflatable core 17 has been clamped and sealed in air or water tight relationship to bulkhead 42, a valve (not shown) at the source of a compressed air supply, for example, is opened, allowing air under pressure to completely fill the inside area of the inflatable core, causing the core to assume a perfect circular form throughout its entire length. The core extends forwardly of, within, and beyond the rear of the continuous pipe laying machine 10, as shown in FIG. 1. It should be noted that the front end 57 of the inflatable core is sealed to prevent the escapte of air at point 41 by the continued downward pressure applied by compression springs 40 to roller 39 and thus to the double thickness of flattened plastic material passing between it and the fixed lower roller 33 as the plastic material is fed from the supply roll 31 to form the inflatable core 17 during the travel of the pipe laying machine 10 forwardly in ditch 11.

It should be understood that the total length of the inflatable core member 17 is only limited by the amount of plastic material in the supply roll 31 and should it be desired to increase this amount, to increase the length of the available inflatable core beyond this limit, a new supply roll of material could be mounted on axle 28, splicing the ends of the rolls as by heat-sealing or other means and thereby providing additional lengths of inflatable core over which the pipe laying machine can travel. When the desired length of continuous concrete pipe has been formed and cured, the inflatable core is cut at the end of the bore of the pipe. This may be done after shutting off the air supply at the source, disconnecting the supply hose 56 at the fitting 55, thereby allowing the air to escape from the inner area or bore 52 of the core and removing the bulkhead structure. In accordance with the invention claimed, core 17 is provided with an outside surface which adheres to the surface of the concrete pipe or conduit 12, thereby forming a lining for conduit 12.

It should also be understood that this invention should not be limited to the use of compressed air for the specific purpose of inflating the cylindrical core member 17, as described in the preceding paragraphs of this description, and that other means such as water under pressure could be used to accomplish the same purpose, by making a few simple changes in the apparatus shown and described. For instance, the quick-disconnect fitting 55 and supply hose 56 could be replaced by suitable plumbing incorporating a control valve and piping leading to the water supply source. A pressure relief valve could be incorporated in the plumbing 53 which leads to the pressure gage 54 to function as a safety valve to prevent excessive pressures which might develop in the water filled core from harming or distorting the core. A water pump may be used to evacuate the water from the cylindrical core member 17 when conduit 12 has set and the water could be pumped back to its source to be used over and over again.

If so desired the core could be removed from the inside surface of the conduit 12 after setting of the concrete but it is the intention of the inventor to provide a lining for the conduit and the disclosed method is a simple and effective way to line the conduit by making the core member 17 a permanent part of the conduit. It should be recognized also that the outer surface of core member 17 may be provided with protrusions or knobs to penetrate into the plastic concrete before setting to cause core member 17 to adhere to the pipe or conduit.

FIGS. 6, 7, 8 and 9 of the drawings disclose further advantages and features of this invention relating particularly to the use of an inflatable core member 23 in conjunction with the continuous pipe laying machine 10.

In concrete pipes, as mentioned above, it is sometimes desirable to incorporate a continuous lining of plastic or other suitable material integral with the inside bore surface of the finished conduit, the purpose of such a lining being to protect the concrete surface from attack by chemical agents contained in or resulting from the fluid carried by the conduit. In addition, such a lining provides a smoother inner conduit surface and thus enhances the hydraulic characteristics of the conduit and its ability to carry fluids under pressures over that of unlined conduits.

FIGS. 6 and 7 illustrate a method and apparatus for incorporating a plastic lining inside of the perimeter of a bore of a concrete conduit formed by the apparatus disclosed in U.S. Pat. No. 2,969,576. Such method and apparatus consists of a suitable length or section of inflatable core member 23 manually threaded through the machine and sealed at both ends by a suitable bulkhead structure such as 42, of which only the rear end is shown. A channel frame member 58 is secured to and projects forward from the front end of machine 10 and consists of a pair of channel members 59 having welded or otherwise secured to their front ends a pair of vertically extending channel members 60. Channel members 60 extend downwardly adjacent the sides of the prepared ditch 11. A transverse U-shaped member 61, which is wider than the ditch, is secured to the top ends of channel members 60 as shown in FIGS. 6 and 7.

The lining material, whether core member 17 of FIGS. 1–6 or that shown in FIGS. 6–9, should have the following physical properties: (a) it should be flexible enough to allow conformation to the required arcuate or cylindrical shape of the conduit bore, (b) it should have a chemical composition resistant to the noxious compounds that might be encountered in the conduit, (c) it should be dense and impervious, and (d) it should be available in either single thickness sheet form or flattened cylindrical form such as used to form the inflatable core 17 previously described.

In the application of a partial lining to the conduit, as shown in FIGS. 6, 7 and 8, the supply roll of material 62 is preferably of sheet form having indentations or projections on one of its surfaces, such as the projections 63 (FIG. 8) or any other surface irregularities which will cause the sheets to adhere to plastic concrete. Material 62 must be of sufficient width to cover the desired circumferential distance within the bore of the conduit to which it is being applied. For this reason, the width of the roll of material 62 is generally wider than the width of ditch 11 and the roll is supported in the transverse U-shaped member 61, over and above the ditch. The material is then pulled down and under a narrower roller 64 which is mounted to freely rotate on a transverse axle 65 which extends between the vertical channel members 60, where it is secured against longitudinal movement by suitable nuts and washers 66. Roller 64 is preferably mounted vertically adjacent, directly above, and centered transversely with the center line 67 of the inflated core 23 and the vertical center of the cylindrical opening 67 formed in a transverse guide baffle plate 69 through which core 23 extends into machine 10.

Suitable guide rollers 70 are securely positioned around the perimeter of opening 67 and are adapted to guide the lining material into its arcuate position over inflated core 23, as the material is threaded into the machine and out the rear of the pipe forming portion 14 of the machine. The initial threading of the lining material 62 from the supply roll, down around roller 64, over the top of the inflated core and under the guide rollers 70, into and out the pipe forming portion of the machine, may be accomplished manually; but after this, the application of the lining material over the core and into position in the machine in a continuous manner is accomplished automatically as the concrete pipe laying machine moves forward in the ditch. When the concrete pipe or conduit 12 has cured or set, the inflatable core 23 is deflated and removed as in U.S. Pat. No. 2,969,576, leaving the partial arcuate lining 71 permanently attached as an integral part to the inside surface of the bore of conduit 12.

The full perimeter circle inner plastic lining 72 shown in FIG. 9 as integrally attached to the full circular perimeter surface of bore 73 of conduit 12 is applied in the same manner and with the same equipment as that used to form and install the inflatable core member 17 previously described in FIGS. 1–6.

Although but a few embodiments of the invention have been shown and described, it will be apparent to those skilled in the art that various changes and modifications may be made therein without departing from the spirit of the invention or from the scope of the appended claims.

I claim:

1. A cylindrical concrete pipe laying machine using a fluid pressure inflatable core comprising:
   a frame having a semi-cylindrical bottom and vertically disposed sides slidably engaging a bottom of a pre-dug trench to receive a pipe,
   a pair of laterally disposed vertical baffles one fixed to the front end and one fixed to the rear end of said frame,
   an elongated horizontally disposed arcuate core support member fixed in spaced position from the inside surface of the bottom and sides of said frame and extending through an opening in said front baffle and rearwardly of said front baffle toward said rear baffle so as to define a space between the bottom of said trench and the underside of said core support member for troweling the lower half of the bore of the pipe to be formed,
   a hopper fixed to said frame above said core support member, said hopper adapted to receive plastic cementitious material,
   a top troweling member fixed to said rear baffle and extending rearwardly of said hopper,
   said hopper being in communication with the space below said core support member and with the top half of a core carried on said core support member,
   means secured to said frame and extending in the direction of movement of said machine for supporting a rotatable roll of flexible impervious material,
   a roll of flexible impervious material rotatably supported on said frame, and
   means for guiding and wrapping said material around at least a part of the core carried on said core support member as said machine moves forward during a pipe forming operation,
   said material adhering to the bore of the formed pipe upon setting of said plastic cementitious material.

2. The cylindrical concrete pipe laying machine set forth in claim 1 wherein said impervious material is provided with means along its outside surface for adhering with said plastic cementitious material upon setting to form a lining for the bore of the pipe.

3. The cylindrical concrete pipe laying machine set forth in claim 1 wherein said frame has a semi-cylindrical body engaging a mating semi-cylindrical bottom of a pre-dug trench.

4. In a concrete pipe laying machine as set forth in claim 2 wherein a tamping device is provided on said hopper to agitate the material dawnwardly in said hopper and around said core.

5. A cylindrical concrete pipe laying machine using a fluid pressure inflatable core comprising:
   a guide portion having a semi-cylindrical bottom and vertically disposed sides slidably engaging a bottom of a pre-dug trench to receive the pipe,
   a laterally disposed vertical baffle fixed to the front end of said guide portion,
   an elongated horizontally disposed core support member having an upwardly facing arcuate semi-cylindrical core engaging surface fixed in spaced position from the semi-cylindrical bottom surface of said guide portion and extending through a circular opening in said baffle and rearwardly of said baffle,
   a portion of said core support member being so positioned as to define a space between the bottom of said trench and the underside of said core support member whereby said core support member provides a troweling surface for the lower half of the bore of said pipe to be formed,
   a hopper fixed to said machine above said core support member,
   a top troweling member fixed to and extending rearwardly of said hopper having a downwardly facing concave semi-cylindrical top troweling surface radially outwardly positioned from the surface of an inflatable core carried by said core support member,
   a passageway interconnecting said hopper interior with the space between said top troweling member and the top half of the inflatable core,
   guide means on said guide portion for distributing a smooth flow of material from said hopper into and filling the space between said core support and the bottom semi-cylindrical surface of said pre-dug ditch,
   means secured to said guide portion and extending in direction of movement of said machine for supporting a rotatable roll of flexible impervious material, and
   means for guiding and wrapping said material around at least a part of the inflated core as said machine moves forward during a pipe forming operation,
   said material adhering to the bore of the formed concrete pipe upon setting of said plastic cementitious material.

* * * * *